United States Patent Office 3,640,938
Patented Feb. 8, 1972

3,640,938
POLYURETHANE COMPOSITION AND ITS USE TO FORM POLYSTYRENE LAMINATES
Anthony F. Finelli, Akron, Ohio, assignor to The Goodyear Tire & Rubber Company, Akron, Ohio
No Drawing. Filed Jan. 31, 1969, Ser. No. 795,692
Int. Cl. C08g 22/04
U.S. Cl. 260—32.8 N                3 Claims

ABSTRACT OF THE DISCLOSURE

This invention relates to polyurethane compositions and to a method of applying polyurethane coatings to polystyrene to produce laminates. The polyurethane compositions are the reaction product of a reactive hydrogen containing material of 400 to about 12,000 molecular weight, an organic polyisocyanate and a curative which has been dispersed in a solvent which does not affect the surface of the polystyrene, the solvent being diacetone alcohol.

---

This invention relates to polyurethane compositions and to a method of applying polyurethane coatings to polystyrene and to the resulting laminates.

Because of its low cost and ease of fabrication polystyrene has become a large volume plastic and especially has found use in foam articles forming a part of refrigerators, coolers, ice chests, furniture items, surfboards or even parts of caskets. It has been appreciated that notwithstanding its cost and wide use that polystyrene has certain inherent disadvantages such as poor solvent resistance and is easily torn, chipped and scuffed. Therefore, it has been desirable for some time to apply a protective film or coating over the polystyrene surface to protect it from solvents, tearing, or chipping, and also to improve its aesthetic appearance.

Since pulyurethanes have excellent resistance to solvents, scuffing, chipping and tearing, it was thought that a polyurethane coating should be applied over the polystyrene. Unfortunately, when it was attempted to coat the polyurethanes on the polystyrene, it was found that the solvents in the polyurethane reaction mixtures materially affected the structural stability of the polystyrene and this has not been heretofore achievable easily and economically.

Therefore, an object of this invention is to provide novel polyurethane compositions which can be coated or laminated to a polystyrene without destroying the structural integrity of the polystyrene and also to provide novel polystyrene polyurethane laminates and the method of making said laminates.

The above objects and other advantages may be achieved by forming a polyurethane reaction mixture in a suitable solvent hereinafter described and applying the solvent solution of the polyurethane reaction mixture to the polystyrene to give it a coat of the desired thickness.

The nature of this invention may be more readily exemplified and understood by the following representative examples wherein all parts are by weight unless otherwise indicated.

EXAMPLE I

A prepolymer was prepared by reacting a mixture of 1 mole of an 80 ethylene/20 propylene adipate of about 1800 molecular weight with 2 moles of tolylene diisocyanate (80/20—2,4/2,6 isomeric mixture). The prepolymer, 100 parts, was diluted with 50 parts diacetone alcohol. A curative solution was prepared by mixing 4.8 parts 4,4'-methylene bis-2-chloraniline, 1.0 part 2-mercaptobenzothiazole and 6 parts diacetone alcohol. The curative solution was added to the prepolymer solution and the resulting mixture had a pot life of 25 minutes. Films were drawn from the mixture and the films were heated at 80° C. for 4 hours. On cooling to room temperature the film showed good rubbery properties.

The fluid mixture of prepolymer and curative was mixed in the above proportions and sprayed on Styrofoam sheets (a commercial polystyrene foam) and allowed to air dry for 24 hours at room temperature. The coating showed strong rubbery properties and good protection of the Styrofoam surface without affecting the structure of the Styrofam. The film showed strong rubbery properties and had the following physical properties:

Tensile (p.s.i.) _____ 5100
Elongation (percent) _____ 620
Thickness (in.) _____ 0.010

Hydroxy ketones such as diacetone alcohol (also known as 4-hydroxy-4-methyl pentanone-2) and 4-hydroxy-2-butanone do not affect the Styrofoam. Beta-hydroxyethyl acetate also does not affect it. Hydroxy ester, hydroxy ethers and hydroxy nitriles also do not affect the Styrofoam.

EXAMPLE II

The prepolymer from Example I, 200 parts, was diluted with 120 parts diacetone alcohol and 10 parts of 10 percent cellulose acetate butyrate in Cellosolve acetate.

The diluted prepolymer, 66 parts, was mixed with a mixture of 4 parts 4,4'-methylene bis(2-chloroaniline), 1 part 2-mercaptobenzothiazole and 10 parts diacetone alcohol. The mixture was sprayed on the bottom surface of a Styrofoam cooler, or ice chest. Upon curing at room temperature the coating developed strong rubbery properties on the Styrofoam which retained its integrity. A film was also drawn on a polyethylene slab and allowed to room temperature cure. The film showed good rubbery properties.

The mixture sprayed well and formed a smooth coating on the Styrofoam. The elastomeric coating on the Styrofoam contributed abrasion and scuff resistance to the Styrofoam and also enhances the appearance of the container, especially when a small amount of a blue or red pigment or lacquer of the vinyl, vinyl acrylic or acrylic type was added to the polyurethane reaction mixture, preferably when added in subsequent coats.

EXAMPLE III

Refrigerator door panels molded from rigid polystyrene cannot be insulated on the backside with rigid polyurethane foam because the solvents used as blowing agents in the rigid urethane foam recipes attack and destroy the polystyrene. To allow the rigid urethane foam insulation to be applied in back of the polystyrene, an elastomeric urethane coating was first sprayed on the backside.

The polyurethane mixture from Example II was sprayed on the backside of a rigid polystyrene refrigerator door panel. It was cured at room temperature to give a strong elastomeric coating on the back of the panel which protects the polystyrene from the damaging effects of the solvents in the polyurethane foaming recipe such as methylene dichloride or the fluorocarbons such as Freon.

EXAMPLE IV

A prepolymer was prepared from a mixture of one mole diethylene glycol adipate of 1000 molecular weight and two moles of tolylene diisocyanate (80/20—2,4/2,6 isomeric mixture). The prepolymer contained 5.8 percent free isocyanate.

A curative solution was prepared from 8.5 parts 4,4'-methylene bis(2-chloroaniline), 8.5 parts methyl ethyl ketone and 40 parts diacetone alcohol. This solution was added to 60 parts of the prepolymer and stirred well before spraying on the Styrofoam. This mixture has at least ten minutes spray time or pot life. The cured coating of the polystyrene foam improved the scuff and chip resistance of the Styrofoam as well as its appearance.

EXAMPLE V

A Styrofoam sculpture was spray coated by first applying a polyurethane elastomer sealer coat to protect the Styrofoam from the effects of solvents used in the body and top color coats. A prepolymer was prepared by reacting 1 mole of 80 ethylene 20 propylene adipate having a molecular weight of 1800, 1 mole of tetramethylene adipate, having a molecular weight of 2000, with 4 moles of 80/20 percent 2,4/2,6 tolylene diisocyanate. The prepolymer was diluted in diacetone alcohol to 50 percent solids.

A curative solution was prepared from 100 parts 4,4'-methylene bis(2-chloroaniline), 14 parts 2-mercaptobenzothiazole, 106 parts methyl ethyl ketone.

A mixture for spray applying the seal coat was prepared from 100 parts of the diluted prepolymer and 10 parts of the curative solution. This was sprayed on the Styrofoam to produce a continuous elastomeric film that sealed the Styrofoam from the solvents used in the subsequent spray coats. The polyurethane coating on the Styrofoam sculpture was allowed to cure at room temperature.

Body coats to impart strength and color were then sprayed over the seal coat. The seal coat was prepared from a prepolymer consisting of the reaction product of 1 mole of polytetramethylene adipate having a molecular weight of 1000 and two moles of 80/20—2,4/2,6 tolylene diisocyanate. The prepolymer (100 parts) was diluted with 30 parts methyl ethyl ketone, 30 parts toluene and 5 parts of 10 percent cellulose acetate butyrate in Cellosolve acetate. To 100 parts of the above diluted prepolymer was added 20 parts of the curative solution used for the sealer coat and 10 parts of a red vinyl-acrylic lacquer. All spray coats were allowed to cure at room temperature.

Topcoats for the final colors on the sculptures were sprayed using a polyurethane reaction mixture having nondiscoloring properties and pigmented with a lacquer of the vinyl-acrylic resin binder. The sprayable nondiscoloring polyurethane reaction mixture was prepared from a mixture of 1 mole of polytetramethylene adipate having a molecular weight of 1000, ½ mole of polytetramethylene adipate of 2000 molecular weight and 3 moles of 4,4'-dicyclohexylmethane diisocyanate. The prepolymer analyzed 4.3 percent isocyanate content (4.3% NCO). The prepolymer was diluted with toluene to 50 percent solids. A curative solution was prepared from 100 parts 3-aminomethyl-3,5,5-trimethyl cyclohexylamine and 400 parts methylisobutyl ketone. This was allowed to age at room temperature at least 24 hours.

To 100 parts diluted prepolymer was added 20 parts curative solution and 10 parts white vinyl acrylic lacquer. After stirring well, the mix was sprayed over the sealer coat to produce a white patent leather finish over the shaped polystyrene foam.

A child's polystyrene surfboard (36" x 14") was spray coated instead of the sculpture above to give an improved surfboard.

The polyurethane reaction mixtures useful in this invention are any of those known to the art which do not contain sufficient solvent to affect the surface structure of polystyrene. These polyurethane reaction mixtures can be prepared by any of the well-known methods such as the 1-shot or prepolymer with or without solvent.

The polyurethane reaction mixture broadly comprises a reactive hydrogen containing material usually of about 400 to 12,000 molecular weight, an organic polyisocyanate and a curative with sufficient diluent to render the mixture sprayable, paintable or otherwise appliable to a polystyrene surface.

The polyester polyols, polyether polyols and the hydrocarbon polyols are representative families of the broad class of materials belonging to the reactive hydrogen containing materials and specific members of these families are shown in U.S. Patents 2,937,151, 2,992,940 and 3,016,356. Also, representative members of the organic polyisocyanates are given in the above-listed patents.

The curative can be water, monomeric or low molecular weight polyols and organic polyamines. Representative examples of these polyols are the glycols of 2 to 20 carbon atoms, trimethylol ethane, trimethylol propane and glycerine. The polyamines are preferably organic diamines of the aliphatic, alicyclic and aromatic class having from about 2 to 20 carbon atoms.

Usually about 1 to 3.5 moles of organic polyisocyanate for each mole of reactive hydrogen containing material is used with the amount of curative being adjusted to give from about 0.1 to 0.9 mole of curative for each mole of isocyanate in excess of the reactive hydrogen containing material, although it is possible to use as much as about 1.1 moles with certain accelerators such as mercaptobenzothiazole without the physicals of the cured polyurethane being affected adversely.

Normally the amount of diluent used is about 5 to 90 percent depending on viscosity of the polyurethane reaction mixture and whether the prepolymer or 1-shot method of preparation is used. It should be appreciated that all the diluent can be diacetone alcohol but in some instances for economic or other reasons it is desirable to replace part of the diacetone alcohol in the diluent with a liquid solvent boiling between about 0 to 400° F. such as the ketones, hydrocarbons, nitroparaffins, halogenated hydrocarbons, esters and mixtures of these. These solvents are well known and normally are used in the paint industry as resin or paint solvents. Representative examples are methyl ethyl ketone, acetone, methyl isobutyl ketone, toluene, benzene, hexane, octane, chlorobenzene, chloro octane, chlorinated methane or ethylene or the fluorinated derivatives thereof, such as the Freons.

The amount of solvent used to replace the diacetone alcohol must be less than that amount that will affect the surface of polystyrene. Generally, this is about 0 to about 15 percent by weight of the total polyurethane reaction mixture on a solids basis depending on solvent affects of the specific solvent used on the polystyrene.

While certain representative embodiments and details have been shown for the purpose of illustrating the invention, it will be apparent to those skilled in this art that various changes and modifications may be made therein without departing from the spirit or scope of the invention.

What is claimed is:

1. A polyurethane reaction mixture having sufficient pot life to be applied comprising a mixture of one mole of a reactive hydrogen containing material of 400 to 12,000 molecular weight, about 1 to 3.5 moles of an organic polyisocyanate and a curative selected from the class of water, low molecular weight polyols and organic polyamines with sufficient diluent to permit the reaction mixture to be applied, said diluent consisting essentially of diacetone alcohol and 0 to 15 percent by weight of a solvent boiling between 0 and about 400° F.

2. A method of making a laminate comprising applying to the surface of a polystyrene, a polyurethane reaction mixture comprising a mixture of one mole of reactive hydrogen containing material of 400 to 12,000 molecular weight, about 1 to 3.5 moles of an organic polyisocyanate, a curative selected from the class consisting of water, low molecular weight polyols and organic polyamines, and sufficient diluent to permit the reaction mixture to be applied to the surface of the polystyrene and curing to form a polyurethane adhered to said polystyrene, said diluent consisting essentially of diacetone alcohol and 0 to 15 percent by weight of a solvent boiling between 0 and about 450° F.

3. The method of claim 2 wherein the polystyrene is foamed.

References Cited

UNITED STATES PATENTS

| | | | |
|---|---|---|---|
| 3,029,172 | 4/1962 | Glass | 117—138.8 |
| 3,251,916 | 5/1966 | Newnham et al. | 161—190 |
| 3,428,609 | 2/1969 | Chilvers et al. | 117—138.8 |

OTHER REFERENCES

Saunders et al.: Polyurethanes, Pt. I, pp. 150–153, Interscience, 1962.

DONALD E. CZAJA, Primary Examiner

M. J. WELSH, Assistant Examiner

U.S. Cl. X.R.

117—138.8 A, 138.8 UA; 156—331; 161—190; 260—75 NH, 77.5 MA, 77.5 AP, 77.5 AM